（12） United States Patent
Kobayashi et al.

(10) Patent No.: US 7,397,189 B2
(45) Date of Patent: Jul. 8, 2008

(54) LAMP DEVICE AND PROJECTOR THEREWITH

(75) Inventors: Hiroyuki Kobayashi, Matsumoto (JP); Shohei Fujisawa, Matsumoto (JP); Toru Terashima, Matsumoto (JP); Kazuhiro Tanaka, Minamiazumi-gun (JP); Takeshi Takezawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 387 days.

(21) Appl. No.: 11/092,583

(22) Filed: Mar. 29, 2005

(65) Prior Publication Data
US 2005/0213327 A1   Sep. 29, 2005

(30) Foreign Application Priority Data
Mar. 29, 2004  (JP) ............................... 2004-094178

(51) Int. Cl.
*H01J 17/30* (2006.01)
*H01J 17/46* (2006.01)
*F21V 7/00* (2006.01)

(52) U.S. Cl. .................... 313/601; 313/602; 313/114; 362/346

(58) Field of Classification Search ................ 313/113, 313/114, 601, 602; 362/346, 261, 262
See application file for complete search history.

(56) References Cited

U.S. PATENT DOCUMENTS

| 5,479,065 | A | * | 12/1995 | Sugimoto et al. ............ 313/113 |
| 6,002,197 | A | * | 12/1999 | Tanaka et al. ............... 313/113 |
| 6,505,958 | B2 | * | 1/2003 | Ooms et al. .................. 362/296 |
| 7,232,241 | B2 |  | 6/2007 | Takezawa |
| 2004/0207306 | A1 | * | 10/2004 | Horiuchi et al. ............. 313/113 |
| 2005/0082986 | A1 | * | 4/2005 | Takezawa et al. ........... 313/634 |
| 2007/0115439 | A1 |  | 5/2007 | Takezawa |

FOREIGN PATENT DOCUMENTS

| JP | 08-031382 | 2/1996 |
| JP | 08-069777 | 3/1996 |
| JP | A 08-096753 | 4/1996 |
| JP | A 2003-092082 | 3/2003 |
| WO | WO 2004/020898 A1 | 3/2004 |

* cited by examiner

*Primary Examiner*—Peter Macchiarolo
(74) *Attorney, Agent, or Firm*—Oliff & Berridge, PLC

(57) ABSTRACT

In a lamp device provided with an arc tube, a principal reflection mirror, and a sub-mirror; a decrease in illumination light, caused by a trigger line disposed to improve the turn-on characteristics of the arc tube, being suppressed. The lamp device include an arc tube having a bulb portion that incorporates electrodes and sealing portions; a principal reflection mirror; a sub-mirror; leads connected to an electrode at an end portion of each of the sealing portions; and a trigger line. The trigger line has a ring-like portion wound around the sealing portion. The trigger line extends from the ring-like portion and has a wiring path that passes a neighborhood of the bulb portion without coming into contact with the bulb portion, further extends along the sealing portion and is connected to the lead. The wiring path is in the same plane that extends through an optical axis.

12 Claims, 7 Drawing Sheets

FIG. 6
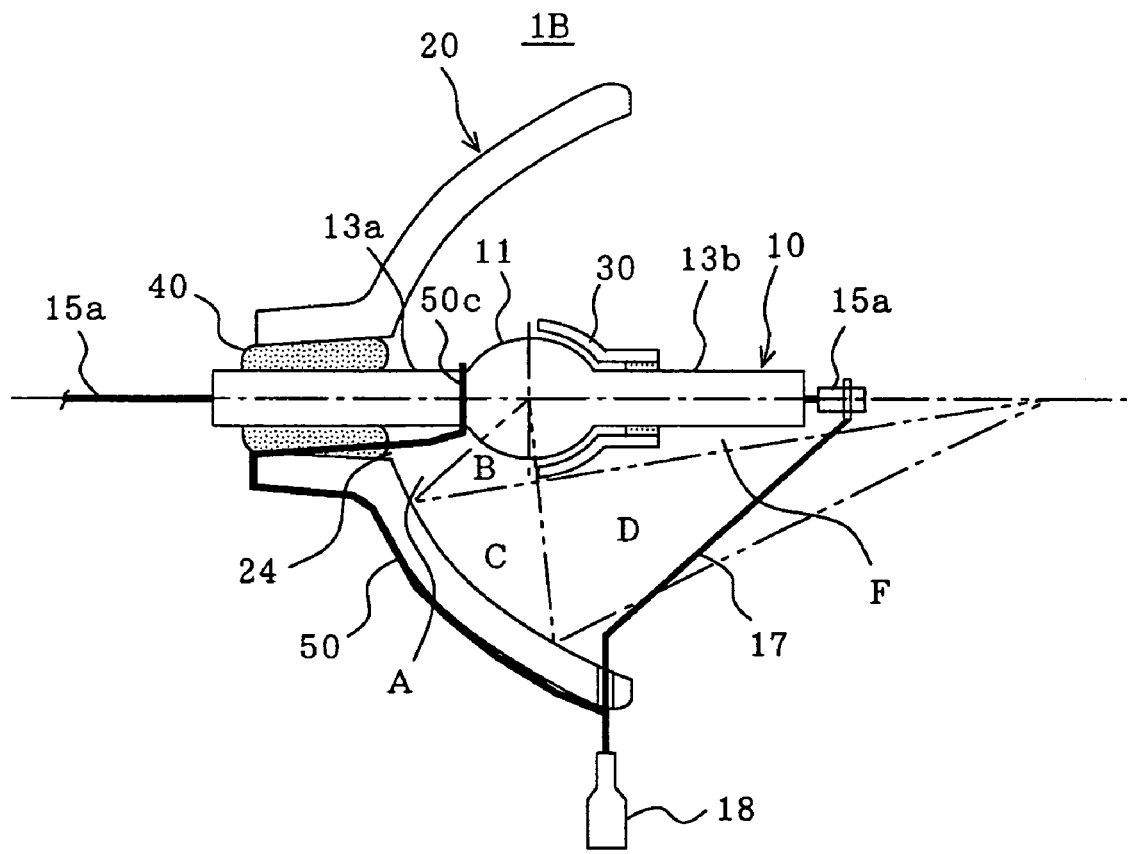
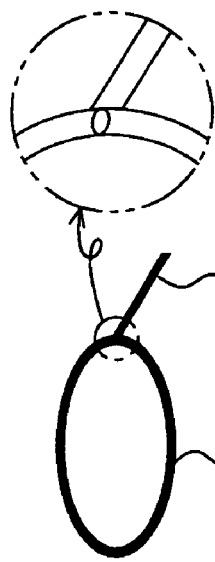
FIG. 7(a)
WELDING
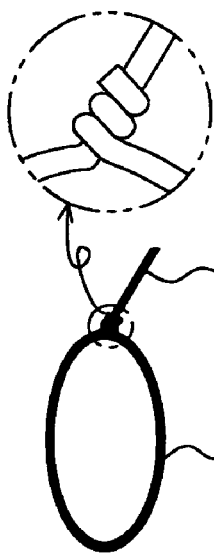
FIG. 7(b)
TWISTING
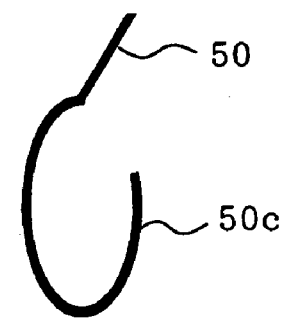
FIG. 7(c)
HOOK TYPE

LAMP DEVICE AND PROJECTOR THEREWITH

BACKGROUND

The exemplary embodiments relate to a lamp device provided with a sub-mirror and a projector provided with the lamp device.

In the related art, a lamp device is provided with an arc tube having a bulb portion that incorporates a pair of electrodes and a principal reflection mirror that directs light exited from the arc tube to a predetermined direction, a sub-mirror of which a reflection surface is faced to the principal reflection mirror with the bulb portion interposed therebetween is disposed to make efficient use of light (see JP-A-8-31382).

Furthermore, in the related art, a lamp device is provided in which one end of a trigger line that is a conductor is wound around a surface of an arc tube at a position in proximity to one electrode of the arc tube and the other end of the trigger line is connected to an external lead that is drawn out of the other electrode to improve the turn-on characteristics (see JP-A-8-69777).

As mentioned above, while a trigger line is effective in improving the turn-on characteristics of an arc tube, depending on a wiring mode of the trigger line, the trigger line works as a light-shielding member to reduce an amount of light irradiated from a lamp device.

The exemplary embodiments were achieved in view of the above problem and intend to provide a lamp device that can suppress or eliminate a decrease in an amount of irradiation light owing to a trigger line that is disposed to improve the turn-on characteristics of the arc tube to a possible small level, and a projector provided therewith. The lamp device includes an arc tube, a principal reflection mirror and a sub-mirror.

SUMMARY

A lamp device according to the exemplary embodiments includes an arc tube that has a bulb portion in which a pair of electrodes is encapsulated, an electrode shaft having an electrode at a tip end of the electrode shaft, a conductive foil in continuation with the electrode shaft, and a pair of sealing portions, each of the sealing portions having an end portion, the bulb portion interposed between the pair of sealing portions, the sealing portions sealing the electrode shaft and the conductive foil, each of which is continually formed from the bulb portion. The lamp device further includes a principal reflection mirror that fastens to one of the pair of sealing portions and reflects light exited from the arc tube toward a region that is illuminated; a sub-mirror that is fastened to the other of the pair of sealing portions and returns light exited from the bulb portion toward the principal reflection mirror; leads, each of which is connected to the conductive foil and drawn out of the end portion of each of the sealing portions; and a trigger line having a ring-like portion and a second portion, the ring-like portion being wound around the sealing portion on a side fastened to the principal reflection mirror and the second portion extending from the ring-like portion; the second portion of the trigger line that extends from the ring-like portion having a wiring path that passes a neighborhood of the bulb portion without coming into contact therewith, further extending along the sealing portion on a side that fastens the sub-mirror up to an end thereof, and being connected to one of the leads that is drawn out of the end portion; and the wiring path being in a same plane that extends through an optical axis and in a plane in a same direction with respect to the optical axis.

According to the above lamp device, a total area that works as a light-shielding material of the trigger line can be made smaller; accordingly, a decrease in irradiation light owing to the trigger line can be suppressed.

The ring-like portion is preferably placed in the neighborhood of the bulb portion in a region that is between the bulb portion and the principal reflection mirror and where light does not extend through. When the ring-like portion is thus placed, an improvement in the turn-on characteristics that is the original effect of the trigger line can be easily obtained and the shielding of a light beam can be avoided or discouraged from occurring owing to the ring-like portion.

Furthermore, the trigger line that extends through the neighborhood of the bulb portion is preferably wired from the neighborhood of a boundary portion between the sealing portion on a side where the principal reflection mirror is fastened and the bulb portion toward the neighborhood of a maximum external diameter portion of the sub-mirror. Thereby, an amount of wiring of the trigger line, in particular, an amount of wiring in a region where incident light and reflection light mingle can be made smaller; accordingly, the trigger line can be suppressed from operating as a light-shielding material.

In a region that surrounds the sub-mirror and where light reflected from the principal reflection mirror extends through, the trigger line is preferably wired substantially parallel with an optical path of the reflected light. Thereby, since an area where the trigger line works as the light-shielding material can be made smaller, an amount of light shielded owing to the trigger line can be suppressed.

A lamp device includes: an arc tube that has a bulb portion in which a pair of electrodes is encapsulated, an electrode shaft having an electrode at a tip end of the electrode shaft, a conductive foil in continuation with the electrode shaft, and a pair of sealing portions, each of the sealing portions having an end portion, the bulb portion interposed between the pair of sealing portions, the sealing portions sealing the electrode shaft and the conductive foil, each of which is continually formed from the bulb portion. The lamp device further includes a principal reflection mirror that fastens to one of the pair of sealing portions and reflects light exited from the arc tube toward a region that is illuminated; a sub-mirror that is fastened to the other of the pair of sealing portions and returns light exited from the bulb portion toward the principal reflection mirror; leads, each of which is connected to the conductive foil and drawn out of the end portion of each of the sealing portions; and a trigger line having a ring-like portion and a second portion, the ring-like portion being wound around the sealing portion on a side fastened to the principal reflection mirror and the second portion extending from the ring-like portion; the ring-like portion being placed in the neighborhood of the bulb portion in a region that is between the bulb portion and the principal reflection mirror, where light does not extend through, the trigger line that extends from the ring-like portion is extended by use of only a region that is between the bulb portion and the principal reflection mirror, where light does not extend through toward the principal reflection mirror, and a wiring is drawn from a through hole disposed outside of a reflection surface of the principal reflection mirror toward a back surface of the principal reflection mirror that is opposite to the reflection surface thereof; and the trigger line that is drawn out toward the back surface of the principal reflection mirror is connected at one end thereof to the lead of the sealing portion on a side where the sub-mirror is fastened and at the other end thereof to an extension lead that is drawn outside of a reflection region of the principal reflection mirror.

In the case of the lamp device, since the trigger line does not enter a region where light extends through of the lamp device, the trigger line is completely inhibited from shielding irradiation light.

The ring-like portion may be formed into any one of a ring-like shape, a hook-like shape or a spring-like shape.

Furthermore, the trigger line is preferably made of a heat-resistant conductive wire having a diameter of 0.3 mm or less and a heat resistant temperature of 1000 degrees centigrade or more. This is because, a light-shielding area owing to the trigger line can be made smaller and the trigger line can be made heat-resistant to a high temperature in the neighborhood of the bulb portion.

A projector according to the exemplary embodiments includes a light source, an optical modulator that modulates a light beam exited from the light source in accordance with image information to form an image, and a projection lens that projects the image, the projector being provided as the light source, with any one of the lamp devices described above.

BRIEF DESCRIPTION OF THE DRAWINGS

FIG. 6 is a sectional schematic of a configuration of a lamp device involving still another exemplary embodiment;

FIGS. 7(a) through 7(c) are schematics exemplifying shapes of a ring-like portion of a trigger line in exemplary embodiments;

DETAILED DESCRIPTION OF EMBODIMENTS

Exemplary Lamp Device

Figure 1:
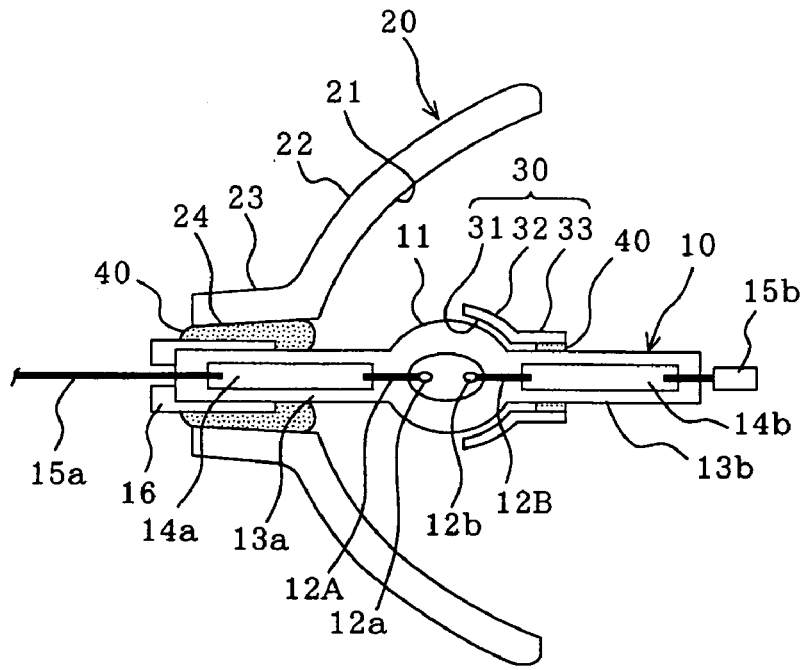
FIG. 1 is a sectional schematic of a configuration of a lamp device in an exemplary embodiment.

FIG. 1 is a sectional schematic showing a configuration of a lamp device that is used in the exemplary embodiments. The lamp device 1 includes an arc tube 10, a principal reflection mirror 20 and a sub-mirror 30.

The arc tube 10, for instance, a high-pressure mercury-vapor lamp, is made of quartz glass, or the like, and includes a bulb portion 11 at a center, and a pair of sealing portions 13a, 13b that are formed on both sides of the bulb portion 11 continuously from the bulb portion 11. Inside of the bulb portion 11, mercury, an inert gas and a slight amount of halogen are sealed, and discharge electrodes 12a, 12b are encapsulated. In the sealing portions 13a, 13b, electrode shafts 12A, 12B that are made of tungsten, or the like, and have the electrodes 12a, 12b each at a tip end thereof and metal foils 14a, 14b made of molybdenum, or the like, that are a conductor in continuation with the electrode shafts 12A, 12B are sealed, and from the metal foils 14a, 14b, power supply leads (lines or terminals) 15a, 15b are drawn out of the respective end surfaces of the sealing portions 13a, 13b. In the example here, a clasp 16 is disposed to an end portion of the sealing portion 13a; however, a mode without the clasp 16 can also be applied. Furthermore, the arc tube 10, may be any other lamp such as a metal halide lamp and a xenon lamp, without restricting to a high-pressure mercury-vapor lamp.

The principal reflection mirror 20 includes a reflector base 22 having a concave reflection surface 21 formed into a paraboloid of revolution or an ellipsoid of revolution, and a tubular portion 23 into which one sealing portion 13a of the arc tube 10 is inserted. The tubular portion 23 is a tubular body that is extended from a center of the reflection surface 21 and the reflector base 22 to a side opposite to the reflection surface 21 and has a through hole 24 concentric with a center of revolution of the reflection surface 21 inside the tubular portion 23. The reflector base 22 and the tubular portion 23 are ordinarily integrally formed into a funnel shape of heat resistant glass. In the arc tube 10, in order that the bulb portion 11 may be on a side of the reflection surface 21 of the principal reflection mirror 20, the sealing portion 13a is inserted from a side of the reflection surface 21 into the tubular portion 23 of the principal reflection mirror 20 and fastened there with an adhesive 40.

The sub-mirror 30 reflects light exited from the bulb portion 11 and returned toward the principal reflection mirror 20. The sub-mirror 30 includes a cup-shaped reflector base 32 provided with a reflection surface 31 and a tubular portion 33 that is extended from the reflector base 32 in a direction opposite of a side of the reflection surface 31 and formed capable of accepting the sealing portion 13b. The sub-mirror 30, with the reflection surface 31 facing the reflection surface 21 of the principal reflection mirror 20, and with the bulb portion 11 interposed therebetween, is fastened to the sealing portion 13b of the arc tube 10 with an adhesive 40.

Between an outer periphery surface of the bulb portion 11 and the reflection surface of the sub-mirror 30, a gap is preferably formed to the extent capable of forming a positional relationship of a light source image and a reflection image, that is, 0.2 mm or more. Thereby, the heat dissipation of the bulb portion 11 on a side that is covered with the sub-mirror 30 can be secured and local heating of the arc tube 10 can be inhibited, discouraged, or prevented from occurring. Furthermore, the sub-mirror 30, being exposed to high temperatures, is preferably formed of, for instance, quartz or Neoceram that is a low thermal expansion material, or translucent alumina, sapphire, quartz, fluorite or YAG that is high-thermal conductivity material. As the translucent alumina, for instance, Sumicorundum (registered trade name of Sumitomo Chemical Co., Ltd.) can be used.

For the adhesive 40 that adheres the sub-mirror 30 to the sealing portion 13b of the arc tube 10 and the adhesive 40 that fastens the sealing portion 13a to the tubular portion 23 of the principal reflection mirror 20, silica-base or alumina-base inorganic adhesives can be used. Specific adhesives may include Sumiceram (registered trade name of Sumitomo Chemical Co., Ltd.).

Figure 2:
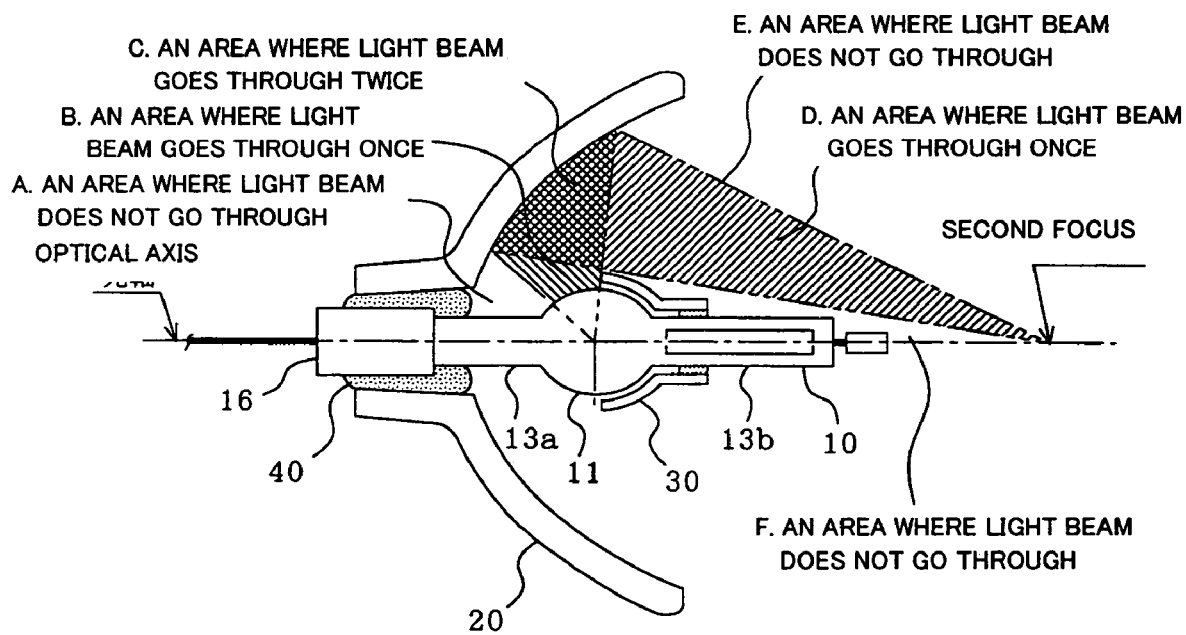
FIG. 2 is a diagram of a light-passing state in the lamp device of FIG. 1.

FIG. 2 is a schematic illustrating light passage in the lamp device of FIG. 1. Light passing in the lamp device is described, with reference to FIG. 2, as follows. A region A that is in the surroundings of the sealing portion 13a and in the neighborhood of a center of the principal reflection mirror 20 is a region where light is not exited from the bulb portion 11 and light does not extend through. Region B is a region where only incident light that is exited from the bulb portion 11 and enters directly or through the sub-mirror 30 into the principal reflection mirror 20 extends through. Region C is a region where incident light that is exited from the bulb portion 11 and enters directly or through the sub-mirror 30 into the principal reflection mirror 20 and an exit light obtained by reflecting the incident light by the principal reflection mirror 20 coexist. Region D is a region where the light beam reflected by the principal reflection mirror 20 extends through. Region E is a region that is outside of a reflection region of the principal reflection mirror 20 and where the light beam does not extend through. A region F is a region that is shielded by the sub-mirror 30 and where light beam does not extend through. The respective regions mentioned above similarly exist in a lower portion of an optical axis of FIG. 2. Bearing this in mind, exemplary embodiments will be explained below.

Exemplary Embodiment 1

Figure 3:
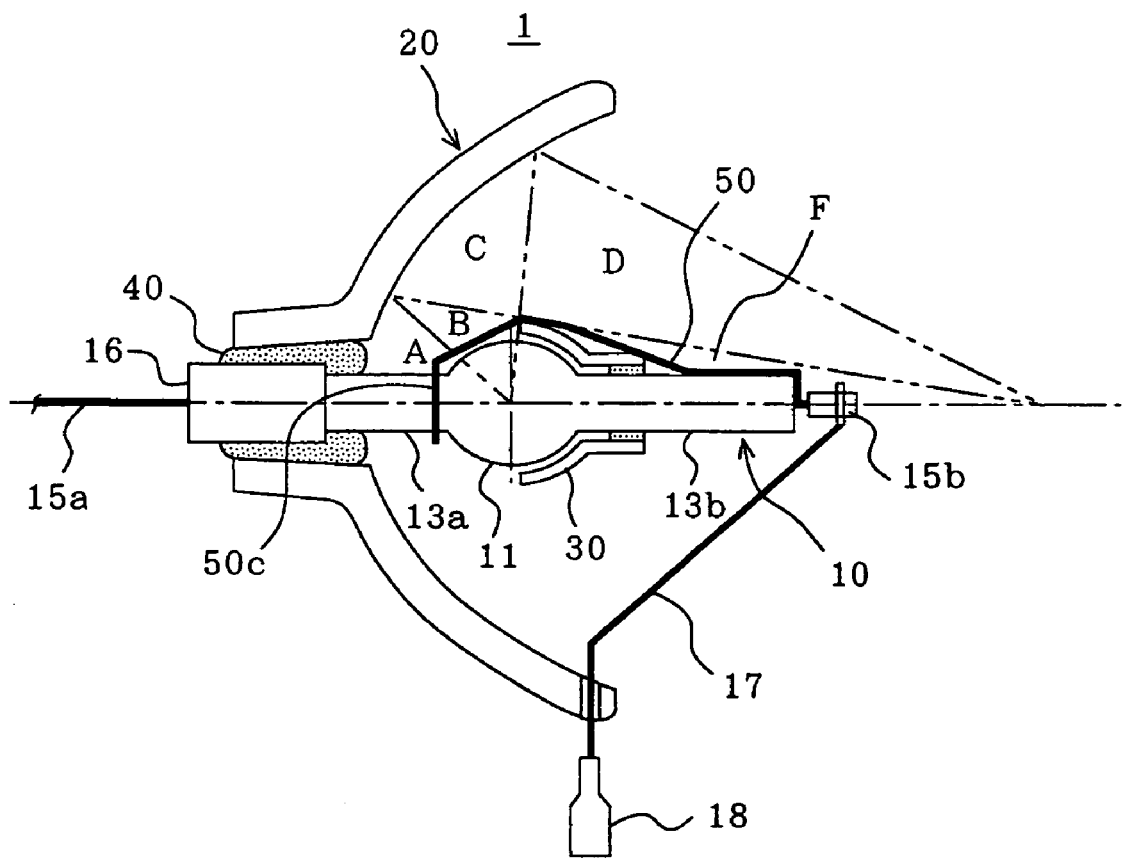
FIG. 3 is a sectional schematic in a configuration of a lamp device of an exemplary embodiment.

FIG. 3 is a sectional schematic showing a configuration of a lamp device 1 involving an exemplary embodiment according to the present invention. The lamp device 1 is obtained by providing a trigger line 50 that improves the turn-on characteristics of the arc tube 10 and an extension lead 17 with a terminal 18 extended from a lead 15b toward a back surface of a tip end of the principal reflection mirror 20. Here, the trigger line 50 is wired as described below.

Figure 8A:
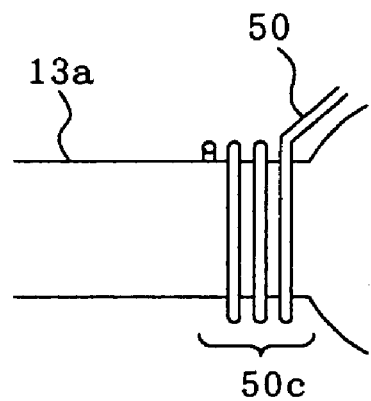
FIGS. 8(a) and 8(b) are schematics of a lamp device in which a spring-like shape is adopted in the ring-like portion of the trigger line in exemplary embodiments.

One end of the trigger line 50 is formed into a ring-like or hook-like, ring-like portion 50c as shown in FIGS. 7(a) through 7(c) or a spring-like, ring-like portion 50c as shown in FIG. 8(a). The ring-like portion 50c is wound around a sealing portion 13a located in a region A. The trigger line 50 has a second portion that extends from the ring-like portion 50c. The second portion of the trigger line 50 that extends from the ring-like portion 50c has a wiring passage that extends through the neighborhood of the bulb portion 11 without coming into contact with the bulb portion 11, extends further along the sealing portion 13b on a side where the sub-mirror 30 is fastened to an end thereof and is connected to a lead 15b drawn out of the end portion by welding or pressure fitting. The wiring passage, except for the ring-like portion 50c, is in the same plane that extends through an optical axis and in a plane in a same direction to the optical axis. The lead 15b and the extension lead 17, without dividing into two, may be formed into one continuous lead.

When the trigger line 50 in FIG. 3 is wired, in particular, the following is preferred.

(1) A position of the ring-like portion 50c in the region A, in order to improve the turn-on characteristics owing to discharge of a pair of electrodes 12a, 12b, is set in the neighborhood of a boundary of the bulb portion 11 and the sealing portion 13a.

(2) In order to make a total amount of wiring of the trigger line 50, in particular, an amount of wiring in a region C where incident light and reflected light coexist, as small as possible, in a portion of the regions B and C, the trigger line 50 is wired from the neighborhood of a boundary of the bulb portion 11 and the sealing portion 13a toward the proximity of the maximum outer diameter portion (a tip end portion of the reflector base 32) of the sub-mirror 30.

(3) In a portion of the region D that surrounds the sub-mirror 30 and where light reflected from the principal reflection mirror 20 extends through, the trigger line 50 is wired along the neighborhood of the sub-mirror 30 to make an amount of wiring thereof as small as possible and substantially parallel with an optical path of light reflected from the principal reflection mirror 20 to make a light-shielding area due to the trigger line 50 smaller.

(4) From a back surface region of the sub-mirror 30 where an outer diameter of the sub-mirror 30 becomes smaller than the maximum outer diameter thereof up to an end portion of the sealing portion 13b, the trigger line 50 is wired in the region F. Accordingly, the trigger line 50 is preferably wired along the sealing portion 13b as long as possible.

In the lamp device 1, configured as mentioned above, light exited from a bulb portion 11 is reflected directly or through a sub-mirror 30 by the principal reflection mirror 20 and is irradiated toward a region that is illuminated; accordingly, the usability of light can be improved. Furthermore, owing to the presence of the trigger line 50, the turn-on characteristics of the arc tube 10 can be enhanced or improved. Still furthermore, a decrease in an amount of illuminating light of the lamp device 1 caused by the trigger line 50 can be suppressed or reduced as small as possible.

Exemplary Embodiment 2

Figure 4:
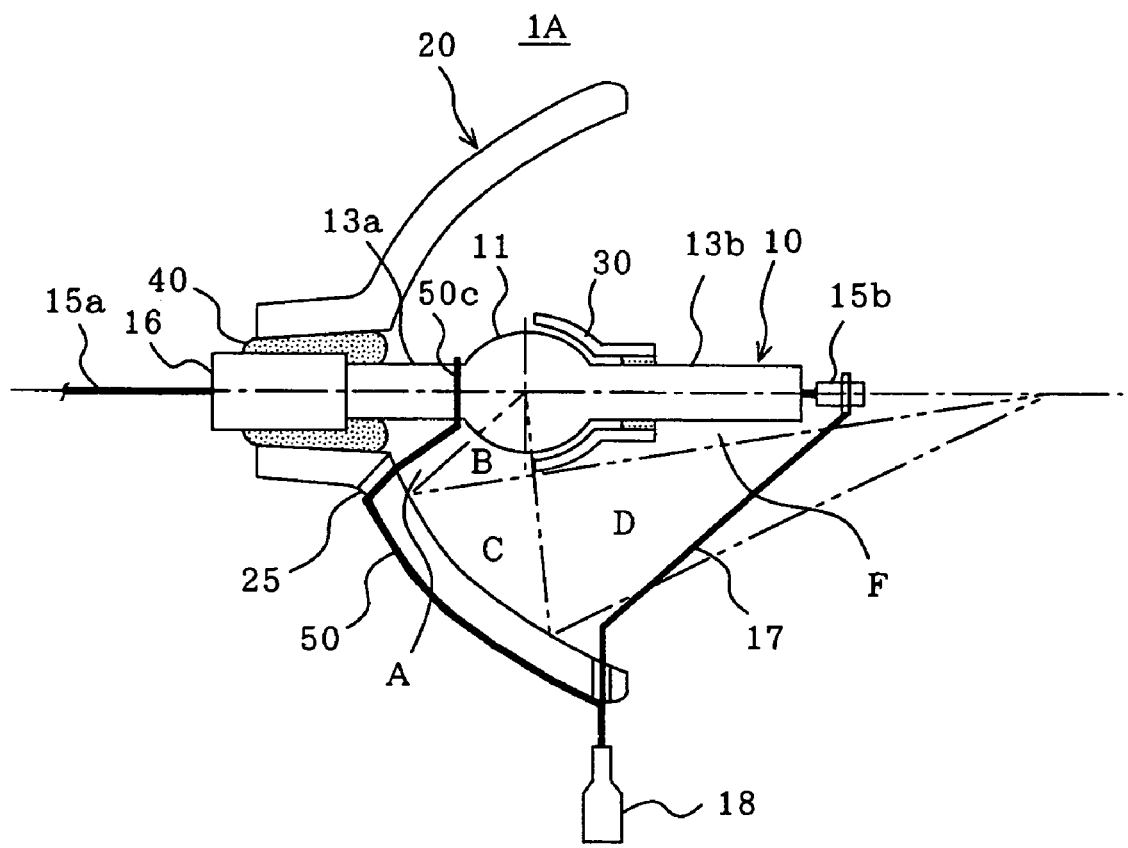
FIG. 4 is a sectional schematic of a configuration of a lamp device involving another exemplary embodiment.
Figure 5A:
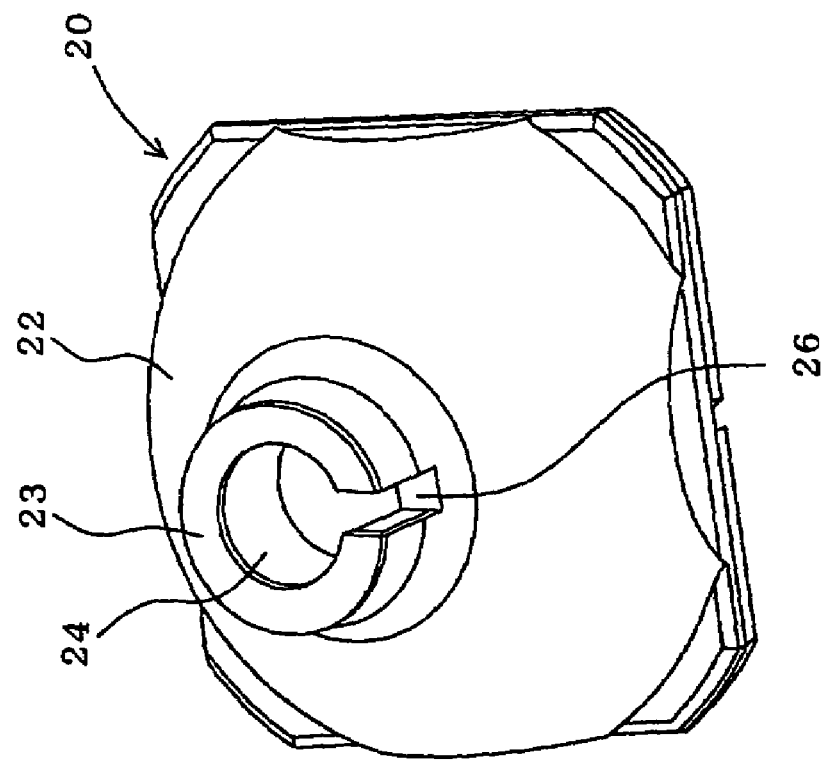
FIGS. 5(a) and 5(b) are rear schematics of a principal reflection mirror that is used in the lamp device of FIG. 4.
Figure 5B:
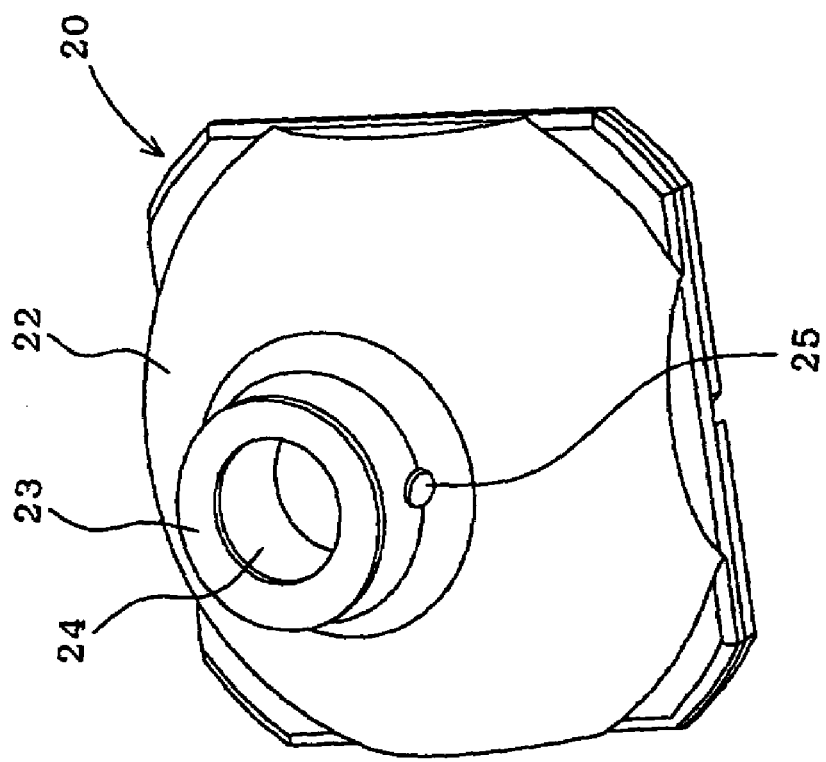

FIG. 4 is a sectional schematic showing a configuration of a lamp device 1A involving another exemplary embodiment. The lamp device 1A is fundamentally the same as the lamp device 1 of FIG. 3 but differs therefrom in the wiring path of the trigger line 50. Here also, a ring-like portion 50c of the trigger line 50 is disposed in the neighborhood of a bulb portion 11 of a region A that is located between the bulb portion 11 and the principal reflection mirror 20 and where a light beam does not extend through. The second portion of the trigger line 50 that extends from the ring-like portion 50c is made of a wiring that is extended toward the principal reflection mirror 20 by making use of only the region A that is located between the bulb portion 11 and the principal reflection mirror 20 and where a light beam does not extend through. The trigger line 50 is drawn from a through hole (through hole 25 in this case) disposed in the neighborhood of a tubular portion that is outside of a reflection surface 21 of the principal reflection mirror 20 to a back surface side of the principal reflection mirror 20 opposite to a side of the reflection surface 21. The trigger line 50 is connected at one end to a lead 15b of the sealing portion 13b and is connected at the other end by welding, or the like, to an extension lead 17 that is drawn outside of the reflection region of the principal reflection mirror 20. A through hole that draws the trigger line 50 from a side of the reflection surface 21 of the principal reflection mirror 20 to a back surface side thereof may be formed into, other than a through hole 25 shown in FIGS. 4 and 5(a), a through-groove 26 as shown in FIG. 5(b).

In the lamp device 1A, light exited from the bulb portion 11 is directly or through the sub-mirror 30 reflected by the principal reflection mirror 20 and illuminated on a side of a region that is illuminated. Accordingly, the usability of light can be enhanced or improved. Furthermore, owing to the presence of the trigger line 50, the turn-on characteristics of the arc tube 10 can be enhanced or improved. Still further, in the case of the lamp device 1A, the trigger line 50 does not enter into a region where light extends through of the lamp device 1A. Accordingly, shield of illuminating light can be completely avoided.

Exemplary Embodiment 3

FIG. 6 is a sectional schematic showing a configuration of a lamp device 1B involving still another exemplary embodiment of the invention. The lamp device 1B, except that as a piercing portion where the trigger line 50 is allowed to extend from a side of a reflection surface 21 of a principal reflection mirror 20 to a side of a back surface thereof, a through hole 24 in which a sealing portion 13a is inserted and fastened is utilized, is fundamentally the same as the lamp device 1A shown in FIG. 4. When the lamp device 1B is thus configured, there is no need of separately disposing a trigger line through hole, or the like, to the principal reflection mirror 20. However, it is necessary to apply an insulating measure such as doing without the clasp 16 disposed at an end portion of the sealing portion 13a and placing in the through hole 24 the trigger line 50 in the neighborhood of a wall surface of the through hole 24. The lamp device 1B exhibits an effect substantially the same as the lamp device 1A.

In the trigger line 50, explained in the above respective embodiments, in view of making a light-shielding area smaller, a diameter thereof is made 0.3 mm or less, and in consideration of a temperature of the bulb portion 11 becoming substantially 1000 degrees centigrade, a heat resistant conductive wire having the heat resistance of 1000 degrees centigrade or more is preferably used. As such, for example, there are electric heating wires with a principal component of aluminum (Al), chromium (Cr), or iron (Fe).

Figure 8B:
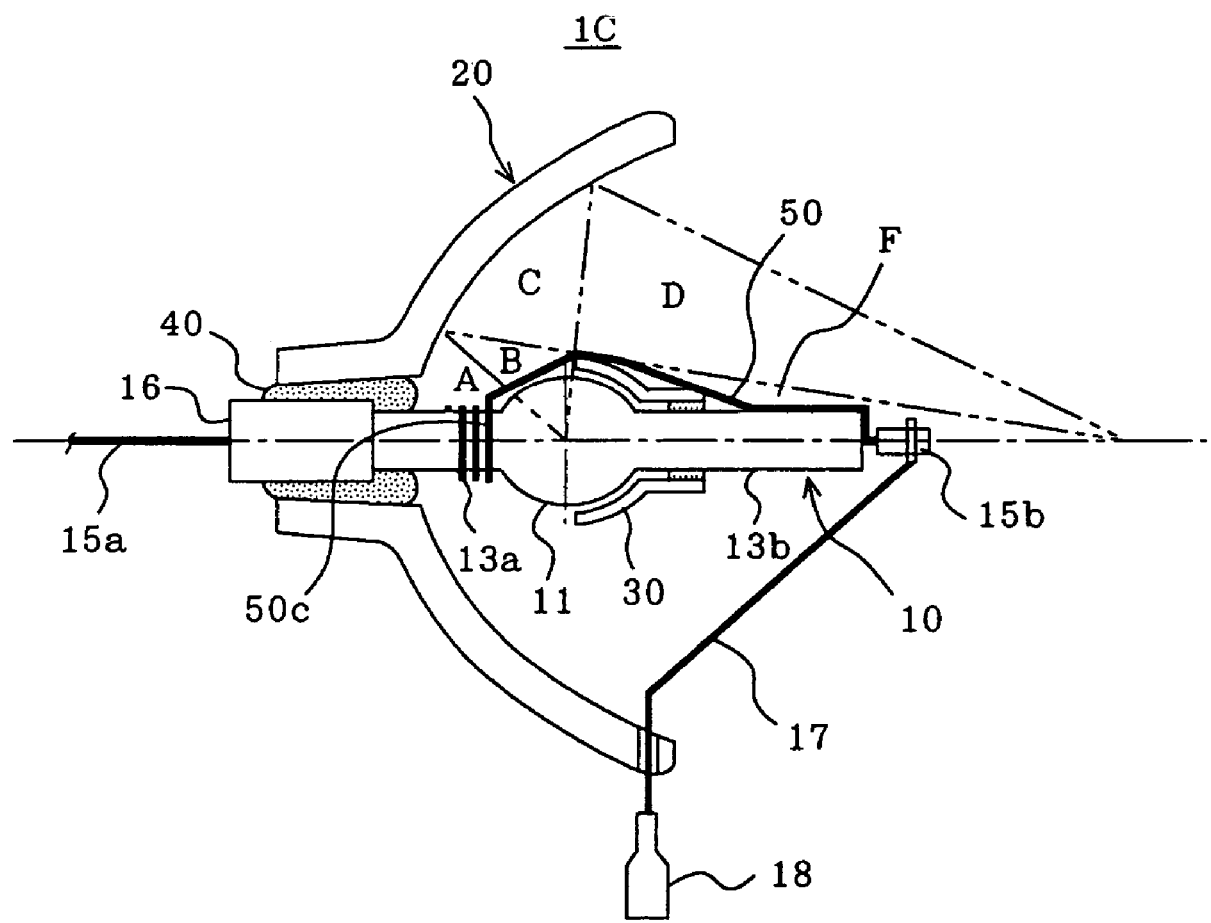

Furthermore, as the ring-like portion 50c of the trigger line 50 explained in the respective exemplary embodiments, shapes such as shown in FIGS. 7(a)-8(b) can be taken. In FIG. 7(a), the ring-like portion 50c is formed into a ring-shape, and the ring-like portion 50c and the trigger line 50 extending therefrom are welded to connect. Still further, in FIG. 7(b), an end portion of the trigger line 50 is folded into a ring-shape and a folded terminal portion thereof is twisted and bound around the trigger line 50. Further, in FIG. 7(c), a tip end of the trigger line 50 is folded into a hook-shape. Still furthermore, in FIG. 8(a), a tip end of the trigger line 50 is wound around the sealing portion 13a a plurality of times to form a spring. FIG. 8(b) is an overall view of a lamp device 1C provided with a spring-shaped ring-like portion 50c. The ring-like portion 50c may be formed into any one of these shapes; however these may be preferably disposed in the abovementioned region A so as not to work as a light-shielding material.

Exemplary Projector

Figure 9:
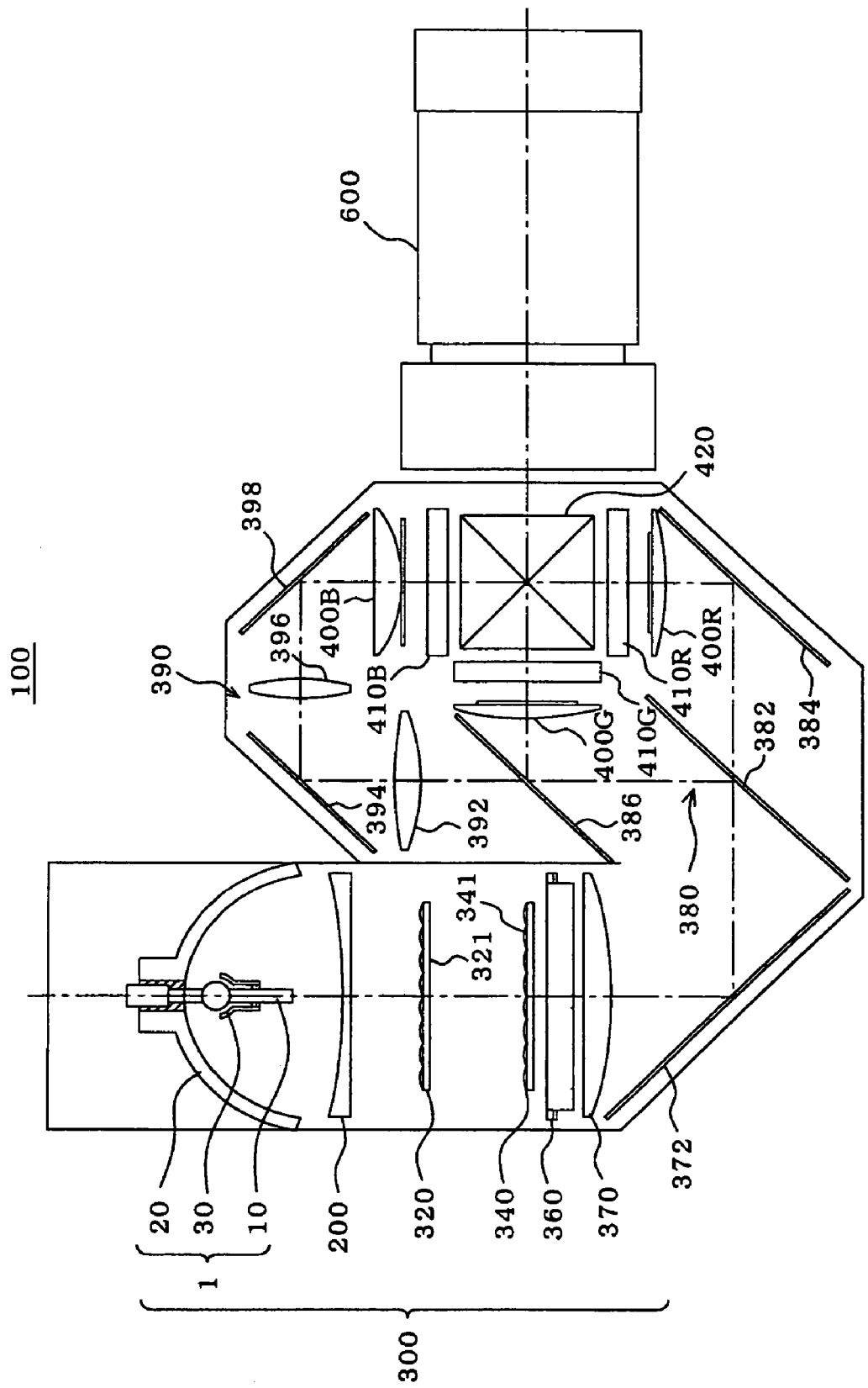
FIG. 9 is a block schematic of a projector in an exemplary embodiment.

FIG. 9 is a block diagram of a projector 100 involving an exemplary embodiment of the present invention. The projector includes an illumination system 300, a color separation system 380, a relay system 390, liquid crystal panels 410R, 410G and 410B, a cross dichroic prism 420 and a projection lens 600.

In what follows, workings of the projector 100 will be explained.

The illumination system 300 is an optical integration system for substantially homogeneously illuminating image-forming regions of the liquid crystal panels 410R, 410G and 410B and includes a lamp device 1 according to exemplary embodiment 1, a first lens array 320, a second lens array 340, a polarization conversion element array 360 and a superimposing lens 370. In place of the lamp device 1, any one of the above-explained lamp devices 1A through 1C may be adopted.

First, light that is exited from an arc tube 10 is reflected by a reflection mirror 20, or a sub-mirror 30 and a reflection mirror 20 toward a region that is illuminated, enters a concave lens 200, and therefore a proceeding direction of light is controlled in a direction substantially parallel with an optical axis of the illumination system 300.

Parallelized light enters the respective small lenses 321 of the first lens array 320 and is divided into a plurality of divisional beams in accordance with the number of the small lenses 321. Furthermore, the respective divisional beams exited from the first lens array 320 enter a second lens array 340 having small lenses 341 corresponding respectively to the respective small lenses 321.

Subsequently, light exited from the second lens array 340 enters the polarization conversion element array 360 to arrange polarization directions of light into the same kind of linearly-polarized light. The plurality of divisional beams of which polarization directions are arranged by the polarization conversion element array 360 enters the superimposing lens 370, and there the respective divisional beams that enter the liquid crystal panels 410R, 410G and 410B are controlled so as to be superposed on corresponding panel surfaces.

Light exited from the superimposing lens 370, after reflected by a reflection mirror 372, enters the color separation system 380. The color separation system 380 is an optical system that separates light exited from the illumination system 300 into three lights (light components) of red, green and blue, and includes dichroic mirrors 382, 386 and a reflection mirror 384.

A first dichroic mirror 382 allows red light to transmit and reflects blue light and green light of light exited from the superimposing lens 370. Red light transmits the first dichroic mirror 382, followed by reflecting by a reflection mirror 384, extends through a field lens 400R and reaches the liquid crystal panel 410R for red light. Of the blue and green colors reflected by the first dichroic mirror 382, the green light is reflected by the second dichroic mirror 386, extends through the field lens 400G and reaches the liquid crystal panel 410G for green light.

On the other hand, the blue light, after transmitting through the second dichroic mirror 386, enters the relay system 390. The relay system 390 is an optical system having a function of leading the blue light transmitted from the dichroic mirror 386 of the color separation system 380 to the liquid crystal panel 400B, and includes a light-incident-side lens 392, a relay lens 396 and reflection mirrors 394, 398.

That is, the blue light, after extending through the light-incident side lens 392, the reflection mirror 394, the relay lens 396 and the reflection mirror 398, further extends through the field lens 400B and reaches the liquid crystal panel 410B for blue light. A reason why the relay system 390 is used for the blue light is that since a length of an optical path of the blue light is longer than that of other colors, the usability of light is inhibited from deteriorating owing to the divergence of light, or the like. That is, it is in order to transmit the divisional beams that have entered in the incident-side lens 392 as that to the field lens 400B. Furthermore, the relay system 390 is configured so as to transmit the blue light of the three lights. However, the relay system 390 may be configured so as to transmit other color of light such as red light.

In the next place, the three liquid crystal panels 410R, 410G and 410B modulate the respective lights entered therein accordance with given image information to form images of the respective lights. Each of light incidence surface sides and light exit surface sides of the respective liquid crystal panels 410R, 410G and 4101B is normally provided with a polarization plate.

Subsequently, modulated lights of the respective lights emitted from the respective liquid crystal panels 410R, 410G and 4101B enter a cross dichroic prism 420 as a light combining system that combines these modulated lights to form a color image. The cross dichroic prism 420 is provided with a red-reflecting dielectric multi-layered film and a blue-reflecting dielectric multi-layered film formed at each of interfaces of four rectangular prisms in a substantial X-shape, and these dielectric multi-layered films combine three lights.

In the next place, a color image exited from the cross dichroic prism 420 is enlarged and projected on a screen with a projection lens 600.

The projector 100, being provided with the afore-mentioned lamp device 1, can suppress or reduce the loss of an amount of illuminating light of the lamp device 1 and is a projector high in the usability of light.

The projector 100 according to the exemplary embodiments, without being restricted to the above described embodiments, can be variously applied within a range that does not deviate from the range described above, and can be modified, for example, as follows.

In the above described exemplary embodiments, two lens arrays 120, 130 are used to divide light exited from the lamp device 1 into a plurality of divisional beams. However, the exemplary embodiments may be applied to projectors that do not use such lens arrays.

In the above described exemplary embodiments, examples of the projectors that use transmissive liquid crystal panels are explained. However, the exemplary embodiments, without being restricted to those described above, may be applied to projectors that use reflective liquid crystal panels. In the case of the projector that has the reflective liquid crystal panels, the projector can be formed only of liquid crystal panels and may or may not have a pair of polarization plates. Furthermore, in the case of the projector that has the reflective liquid crystal panels, the cross dichroic mirror may separate illuminating light into three colors of red, green and blue, and in some cases may combine modulated three lights again to exit in the same direction. Furthermore, in some cases, a plurality of triangular prism- or quadratic prism-like dichroic prisms are combined to form a dichroic prism and the dichroic prism is used in place of the cross dichroic prism. Also when the exemplary embodiments are applied to the projectors that use the reflective liquid crystal panels, effects substantially identical as that of the transmissive liquid crystal panels can be obtained.

Furthermore, the projector that has three liquid crystal panels as the modulator is exemplified above; however, even to projectors having a configuration in which one, two or four or more liquid crystal panels are used, the exemplary embodiments can be applied.

Still furthermore, the light modulator that modulates incident light to form an image is not restricted to the liquid crystal panels, and may be, for instance, a device that uses micro-mirrors. In addition, the lamp device according to the exemplary embodiments can be applied to any of a front projection type projector in which an image is projected from a direction from which a projected surface is observed, or a rear projection type projector in which an image is projected from a direction opposite to that from which a projected surface is observed.

What is claimed is:

1. A lamp device, comprising:
    an arc tube having a bulb portion in which a pair of electrodes is encapsulated, an electrode shaft having an electrode of the pair of electrodes at a tip end of the electrode shaft, a conductive foil in continuation with the electrode shaft, and a pair of sealing portions, each of the sealing portions having an end portion, the bulb portion interposed between the pair of sealing portions, the sealing portions sealing the electrode shaft and the conductive foil, each of which is continually formed from the bulb portion;
    a principal reflection mirror that fastens to one of the pair of sealing portions and reflects light exited from the arc tube toward a region that is illuminated;
    a sub-mirror that is fastened to the other of the pair of sealing portions and returns light exited from the bulb portion toward the principal reflection mirror;
    leads, each of which is connected to the conductive foil and drawn out of the end portion of each of the sealing portions; and
    a trigger line having a ring-like portion and a second portion, the ring-like portion being wound around the sealing portion on a side fastened to the principal reflection mirror and the second portion extending from the ring-like portion;
    the second portion of the trigger line that extends from the ring-like portion having a wiring path that passes a neighborhood of the bulb portion without coming into contact therewith, further extending along the sealing portion on a side that fastens the sub-mirror up to an end thereof, and being connected to one of the leads that is drawn out of the end portion; and
    the wiring path being in a same plane that extends through an optical axis and on the same side with respect to the optical axis so as not to cross the optical axis.

2. The lamp device according to claim 1, the ring-like portion being placed in a proximity of the bulb portion in a region that is between the bulb portion and the principal reflection mirror, where a light beam does not extend through.

3. The lamp device according to claim 1, the trigger line that extends through the neighborhood of the bulb portion being wired from a vicinity of a boundary portion between a sealing portion on a side that is fastened to the principal reflection mirror and the bulb portion toward a neighborhood of a maximum external diameter portion of the sub-mirror.

4. The lamp device according to claim 1, the trigger line being wired substantially in parallel with an optical path of the reflected light in a surrounding region of the sub-mirror where light reflected from the principal reflection mirror extends through.

5. The lamp device of claim 1, the ring-like portion being formed into any one of a ring-like shape, a hook-like shape or a spring-like shape.

6. The lamp device of claim 1, the trigger line being made of a heat-resistant conductive wire having a diameter of 0.3 mm or less and a heat resistant temperature of 1000 degrees centigrade or more.

7. A projector provided with the lamp device of claim 1, the projector comprising:
    a light source having a light beam, an optical modulator that modulates the light beam exited from the light source in accordance with image information to form an image, and a projection lens that projects the image.

8. The projector according to claim 7, the ring-like portion being placed in a proximity of the bulb portion in a region that is between the bulb portion and the principal reflection mirror, where a light beam does not extend through.

9. The projector according to claim 7, the trigger line that extends through the neighborhood of the bulb portion being wired from a vicinity of a boundary portion between a sealing portion on a side that is fastened to the principal reflection mirror and the bulb portion toward a neighborhood of a maximum external diameter portion of the sub-mirror.

10. The projector according to claim 7, the trigger line being wired substantially in parallel with an optical path of the reflected light in a surrounding region of the sub-mirror where light reflected from the principal reflection mirror extends through.

11. The projector of claim 7, the ring-like portion being formed into any one of a ring-like shape, a hook-like shape or a spring-like shape.

12. The projector of claim 7, the trigger line being made of a heat-resistant conductive wire having a diameter of 0.3 mm or less and a heat resistant temperature of 1000 degrees centigrade or more.

\* \* \* \* \*